United States Patent

[11] 3,598,031

| [72] | Inventor | Donald M. Harvey |
| | | Rochester, N.Y. |
| [21] | Appl. No. | 614,086 |
| [22] | Filed | Feb. 6, 1967 |
| [45] | Patented | Aug. 10, 1971 |
| [73] | Assignee | Eastman Kodak Company |
| | | Rochester, N.Y. |

[54] PHOTOGRAPHIC CAMERA WITH MEANS FOR VARYING A FOCUS ADJUSTMENT TO PHOTOGRAPH AN ARTIFICALLY ILLUMINATED SUBJECT
15 Claims, 8 Drawing Figs.

[52] U.S. Cl. .................................................. 95/11
[51] Int. Cl. ................................................ G03b 17/12
[50] Field of Search .................................. 95/11, 11 L, 11.5; 240/1.3

[56] References Cited
UNITED STATES PATENTS
| 2,616,342 | 11/1952 | Thompson | 95/11 |
| 3,205,801 | 9/1965 | Peterson | 95/11.5 |
| 3,318,215 | 5/1967 | Schiks | 95/11.5 |
| 3,373,670 | 3/1968 | Lawson | 95/11 |
| 3,373,671 | 3/1968 | Jakob | 95/11 |

Primary Examiner—Samuel S. Matthews
Assistant Examiner—Fred L. Braun
Attorneys—Robert W. Hampton and Steve W. Gremban ABSTRACT: A camera having an optical lens system for automatically changing the focal distance of the objective lens in response to movement of an artificial illuminating device between an operative and an inoperative position on the camera. The illuminating device may be a built-in flash unit, a flashbulb, or a detachably mounted flash unit. The optical lens system consists of a fixed lens component and a movable lens component which is moved into or out of registry with the fixed lens component when the illuminating device is moved between the operative and inoperative positions.

PATENTED AUG 10 1971 3,598,031

DONALD M. HARVEY
INVENTOR.

BY *Steve O. Grambau*
*Robert W. Hampton*
ATTORNEYS

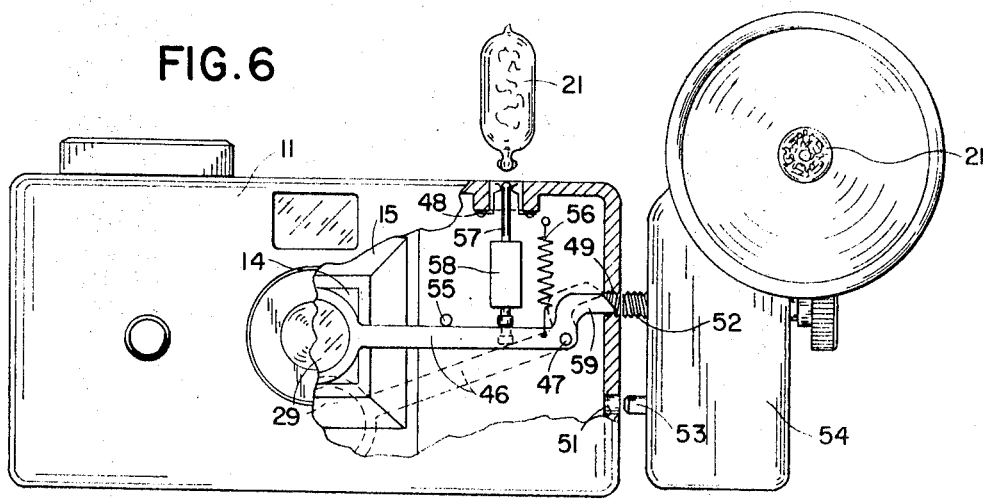
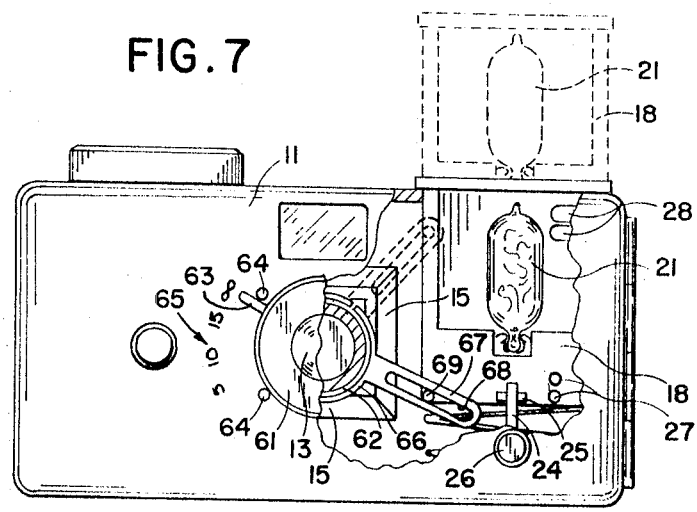
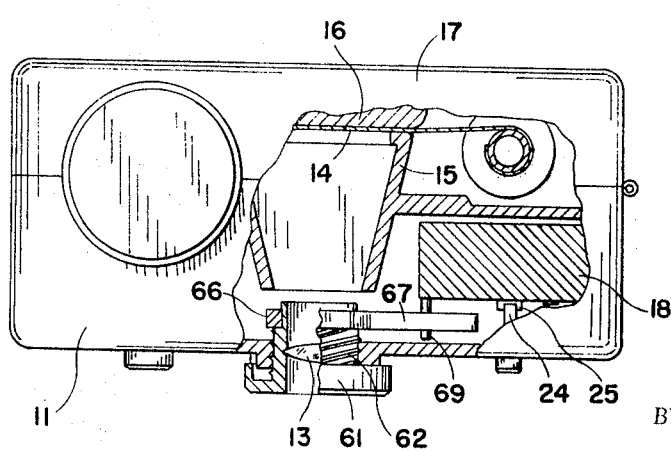

PHOTOGRAPHIC CAMERA WITH MEANS FOR VARYING A FOCUS ADJUSTMENT TO PHOTOGRAPH AN ARTIFICIALLY ILLUMINATED SUBJECT

This invention relates generally to cameras, and more specifically to automatic focusing means for a camera responsive to flash means.

When a flashbulb or other source of artificial illumination is mounted on or near a camera to illuminate a subject to be photographed, the distance range within which the subject will be illuminated sufficiently for a proper exposure is a function of the light output of the particular type of bulb employed, the shutter speed and diaphragm opening of the camera and sensitivity of the film in the camera. Even at rather close range, the illumination afforded by a flashbulb is often less than that provided by daylight, for which reasons various cameras are provided with means for increasing the exposure by increasing the lens diaphragm opening or retarding the shutter speed when the camera is prepared for making a flash exposure. However, even when the exposure is so increased, the range within which a proper exposure can be made is limited typically to about 10 feet. This effective illumination range includes distances which are closed to the camera than the usual hyperfocal distance of the lens, i.e., the distance beyond which all subjects are in acceptably sharp focus. Therefore, if the camera has a lens adjustable to various distances, it must be adjusted manually to a corresponding short distance setting when a flash exposure is to be made. In fixed focus cameras, however, acceptable pictures can be achieved with flash illumination only when the subject is beyond the fixed hyperfocal distance, typically about 6 feet, but still within the effective illumination range.

To insure proper focusing of the camera while flash exposures are made and to extend the distance range within which such exposures can be made with cameras having fixed focus lenses, the present invention contemplates within its scope automatically adjusting the optical system of the camera to properly focus subjects within the effective illumination range of the associated illuminating device, in response to the execution of an act required to prepare or condition the camera for making a flash exposure, e.g. the installation of a flashbulb, the movement of a flash device to an operative position, etc. If the camera is provided with an axially movable lens, such an adjustment is accomplished by moving the lens automatically to increase the distance between the lens and the film plane. If the camera is of the fixed focus type, a similar adjustment is effected automatically by means of a supplemental optical element movable into or out of the optical path in response to such preparation of the camera.

The invention and advantages thereof other than those set forth above will be apparent from the various illustrative embodiments of the invention explained in the following detailed description, reference being made to the accompanying drawings in which like reference numerals refer to like elements and in which:

FIG. 6 is a view corresponding to FIGS. 1 and 4 showing yet another embodiment of the invention, in which the supplemental optical element behind the objective lens is moved in response to the installation of a flashbulb in a socket or the attachment of a removable flash gun unit;

Figure 1:
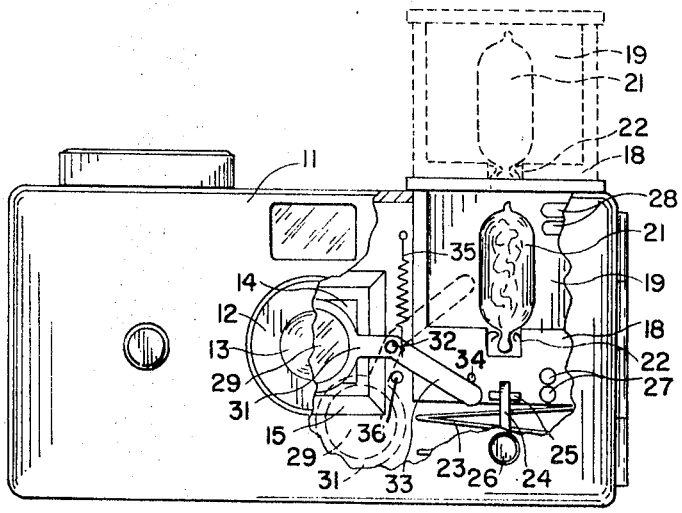
FIG. 1 is a front elevational view of a camera according to a preferred embodiment of the invention, with portions of the camera broken away to show internal structural features, by means of which a supplemental element is movable into rearward alignment with the fixed focus objective lens, in response to movement of a flash unit incorporated in the camera.
Figure 4:
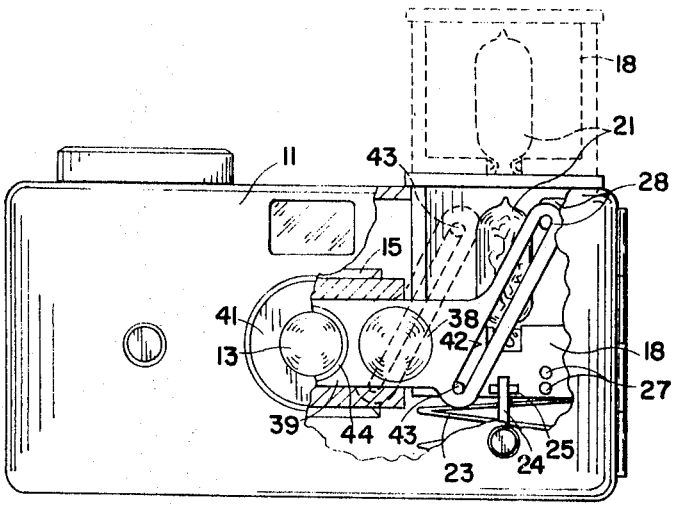
FIG. 4 is a view corresponding to FIG. 1 showing another embodiment of the invention in which the supplemental optical element is movable into forward alignment with the fixed focus objective lens.

FIG. 7 is a view corresponding to FIGS. 1, 4 and 6, showing still another embodiment of the invention in which an axially adjustable objective lens is moved forwardly to its shortest subject focusing position in response to movement of a built-in flash unit to its operative position; and FIG. 8 is a top plan view of the camera shown in FIG. 7 with portions thereof broken away and cross-sectioned to illustrate structural details.

Figure 2:
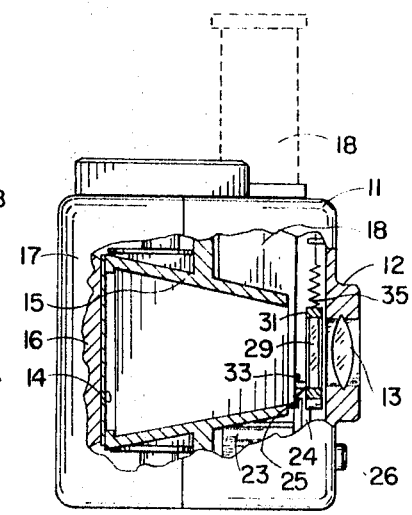
FIG. 2 is an end elevational view of the camera shown in FIG. 1, with portions thereof broken away and cross-sectioned to illustrate internal details.

The camera shown in FIGS. 1 and 2 comprises a casing 11 supporting a lens housing 12, within which lens 13 is mounted in fixed relation to the camera a film 14, supported in alignment therewith against the rearward surface of rectangular cone member 15 by a pressure plate 16 on a hinged casing cover member 17. The objective lens is illustrated as a simple single element lens, but might actually include several cemented or spaced elements.

A flash unit is incorporated within the camera and comprises a drawer member 18 including a curved reflector 19 located behind a flashbulb 21 supported in socket 22. The drawer member 18 is slidable in the camera casing for movement between a retracted position, as shown in solid lines, and an extended operative position, as shown in broken lines. A folded leaf spring 23 is adapted to urge the flash unit to its extended position upon release of latch member 24 from catch 25 on the drawer 18, by depression of push button 26. To enable a fresh bulb to be stored in the retracted unit, ready for use when the unit is extended, the electrical connection of the bulb to the battery and synchronizing switch, not shown, is accomplished through contact pins 27 on the drawer member 18, which engage corresponding contact blades 28 supported by casing 11, only when the flash unit is in its raised operative position.

Since the objective lens, as such, is not adjustable to different focal distances, the camera is of the so-called fixed focus type, intended to photograph only subjects within the hyperfocal range of the lens. Therefore, even though a subject close to the camera may be illuminated adequately by a flashbulb, the distance range within which a satisfactory exposure can be made is limited to that portion of the hyperfocal range of the lens within which the bulb can provide adequate illumination.

Figure 3:
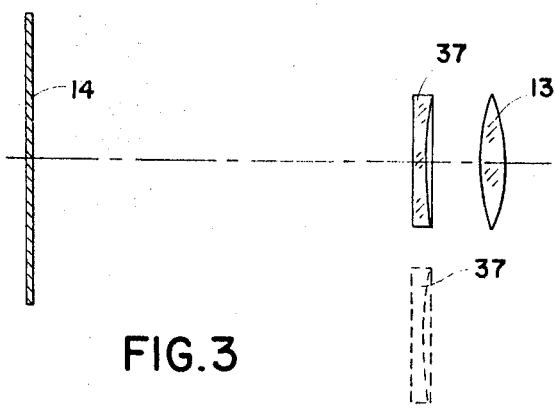
FIG. 3 is a schematic view showing a negative lens employed as the movable supplemental optical element in a camera as illustrated in FIGS. 1 and 2.

To automatically reduce the focal range of the camera in response to movement of the flash unit to its operative position, whereby subjects within the effective illumination range of the flashbulb will be in proper focus even though closer to the camera than the hyperfocal distance of the fixed focus lens 13, a supplemental optical element 29 is supported rearwardly of the lens by carrier member 31 pivotally supported by pin 32. When the flash unit is retracted, arm 33 of the carrier member is engaged by a pin 34 on the drawer member 18 and moved thereby, against the influence of spring 35, to the position illustrated in solid lines, whereby the supplemental optical element 29 is located behind the objective lens in the optical path thereof. As shown in FIG. 2, this embodiment of the invention employs as the supplemental optical element 29, a flat transparent plate or disk of glass or other transparent material, which, being located in the converging ray path of the objective lens, has the effect of extending the focal distance between the lens and its image plane. Accordingly, by properly selecting the material and thickness of the supplemental element 29, the image of a relatively distant subject is caused to be focused at the film plane when the element is located in the optical path. However, when the flash unit is raised to its operative position, spring 35 moves carrier 31 to remove the supplemental element 29 from the optical path of lens 13 to the position shown in broken lines, defined by the engagement of arm 33 with pin 36, thereby reducing the focal length of the optical system so that the image of a subject within the effective illumination range of the flashbulb will be focused at the film plane. It should be understood, of course, that the depicted optical elements are illustrative only, and are not necessarily of proper configuration to produce the desired optical characteristics. While a negative lens might be used in place of the flat disk to achieve this same result, as shown at 37 in FIG. 3, or a positive lens adapted to be moved into rather than out of alignment with the objective lens for flash exposures, the use of a flat supplemental element avoids the necessity of positioning that element accurately in coaxial alignment with the objective lens and also requires less critical location thereof relative to the objective lens and the film plane than would be involved if the supplemental element comprised a lens.

Figure 5:
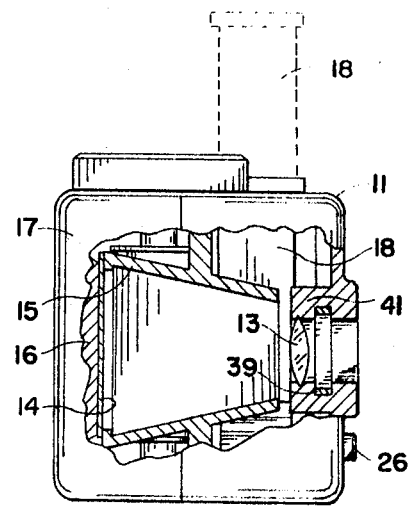
FIG. 5 is a view corresponding to FIG. 2 illustrating the internal construction of the camera shown in FIG. 4.

FIGS. 4 and 5 illustrate another embodiment of the invention, similar to the one previously described, but employing a supplemental optical element comprising a positive lens 38 supported by a slide member 39 ahead of the objective lens 13, which is mounted rearwardly of the front wall of the camera by a lens support member 41. Adjacent the flash unit, the slide member 39 defines an angular slot 42 which receives pin 43 on the drawer member 18, whereby the slide member assumes the position shown in solid lines when the flash unit is retracted and the position shown in broken lines when the flash unit is extended. When the flash unit is retracted, opening 44 in the slide member is aligned with the objective lens to allow normal daylight exposures to be made of subjects within the hyperfocal range of the lens. However, when the flash unit is extended, the slide member moves the positive supplemental lens 38 into frontal alignment with the objective lens, thereby reducing the focal range of the camera to correspond to the effective illumination range of the flashbulb, in the same manner as if a so-called "close-up" lens were installed manually. As previously mentioned, a similar result could also be achieved by utilizing a supplemental negative lens, in which case the positions of the lens and opening 44 would be reversed.

FIG. 6 shows still another embodiment of the invention, similar to that shown in FIGS. 1 and 2, in which the carrier member supporting the supplemental optical element 29 rearwardly of the objective lens 13 is modified to include a support arm 46 pivotally supported by pivot pin 47. In this embodiment, the camera is not provided with a retractile flash unit, but rather with a socket 48 adapted to receive a flashbulb 21. Also, the camera is provided with a threaded hole 49 and a guide hole 51, adapted respectively to receive screw member 52 and support pin 53 of an auxiliary flash unit 54, to mount the latter in operative relation to the camera. It should be apparent, however, that the provision of the camera with both of these flash systems is intended merely to illustrate representative examples of many different types of integral and/or auxiliary illumination devices that might be associated with a camera within the spirit of the invention.

When the camera is being used for daylight photography, i.e. when neither the flashbulb nor the auxiliary flash unit is installed, the carrier member is positioned with arm 46 maintained in contact with pin 55 by spring 56 to locate the supplemental optical element in rearward alignment with the objective lens. When a flashbulb is installed in socket 48, however, rod 57, slidably supported in socket 58, is depressed by the base of the bulb to move the carrier member to the position shown in broken lines against the influence of spring 56, thereby removing the supplemental optical member from the optical path of the objective lens. Similarly, when the auxiliary flash unit is installed, screw member 52 engages an ear 59 on the carrier member and moves the carrier member in the same manner to displace the supplemental lens out of the optical path.

FIGS. 7 and 8 illustrate yet another embodiment of the invention, incorporated in a camera similar to the one previously described, including a retractile flash unit comprising drawer member 18. In this embodiment, however, the objective lens 13 is mounted in lens housing 61, movably supported in the front wall of casing 11 by cooperating threads 62, whereby manual rotation of the housing results in axial movement of the lens relative to the film plane to focus the lens for different distance ranges. A lug 63 on the side of the lens housing limits its rotational movement by cooperation with stop pins 64 and also serves to indicate the distance setting of the lens by means of appropriate indicia on the camera casing, as shown at 65.

To adjust the lens automatically to its closest distance setting when the flash unit is extended, a ring 66 frictionally engages the periphery of housing 61 rearwardly of the front casing wall, and is provided with an arm 67 defining an elongate slot 68 in which is received a pin 69, extending forwardly from the drawer member 18. By this arrangement, the ring member 66 rotates to the position shown in solid lines when the flash unit is retracted and to the position shown in broken lines when the flash unit is extended. Due to the frictional engagement of ring 66 with lens housing 61, the latter can be adjusted manually regardless of the position of the flash unit, but raising the flash unit will always result in rotational movement of housing 61 to extend the lens 13 to its nearest distance setting, whereas retraction of the flash unit will always retract the lens housing 61 automatically to its most distant setting.

While the above-described embodiments of the invention illustrate specific combinations of focus adjusting and illuminating means, it should be understood that any of these various focus adjusting means, or other means for performing the same function, could be operated automatically in response to the performance of any movement of a camera element required to prepare the camera for taking an artificially illuminated photograph, including the movement of a reflector or flash unit to an operative position, the attachment of an auxiliary unit, the operation of an electric switch in the illuminating circuit, the installation of a flashbulb, etc. Accordingly, the foregoing description of the invention is to be considered as illustrative only and not as limiting the scope of the invention, as defined by the appended claims.

I claim:

1. In a camera, a housing; an objective mounted in said housing and comprising a plurality of optical lens components each having a predetermined focal length and including a first stationary lens component of fixed focal length and a second component movable between first and second positions into and out of registry with said first component to thereby reduce the focal length of said objective in the position of registry with said first component; an illuminating arrangement including a member movable with reference to said housing between operative and inoperative positions; and motion-transmitting means for moving said second component with reference to said first component in response to movement of said member with reference to said housing.

2. In a camera, a housing; an objective mounted in said housing and comprising a plurality of optical lens components each having a predetermined focal length and including a first stationary lens component of fixed focal length and a second component movable between first and second positions into and out of registry with said first component to thereby reduce the focal length of said objective in said second position of registry with said first component; an illuminating arrangement including a member movable with reference to said housing between operative and inoperative positions; and motion-transmitting means for moving said second component from said first position to said second position in response to movement of said member from said inoperative position to said operative position so that the second component registers with said first component when the camera is set for operation with artificial illumination.

3. In a camera; a housing; an objective mounted in said housing and comprising a plurality of optical lens components each having a predetermined focal length and including a first stationary lens component of fixed focal length and a second component movable into and out of registry with said first component to thereby reduce the focal length of said objective in the position of registry with said first component; an illuminating arrangement built into said housing and including a member movable between operative and inoperative positions; and motion-transmitting means for moving said second component into registry with said first component in response to movement of said member to operative position.

4. In a camera; a housing; an objective mounted in said housing and comprising a plurality of lens components including a first component of fixed focal length and a second component movable into and out of registry with said first component to thereby change the focal length of said objective; and a flash unit built into said housing and including a reflector movable between operative and inoperative positions; and motion-transmitting means for moving said second component into registry with said first component in response to movement of said reflector to operative position.

5. In a camera; a housing; an objective mounted in said housing and comprising a plurality of optical lens components each having a predetermined focal length and including a first stationary lens component of fixed focal length and a second component movable between first and second positions into and out of registry with said first component to thereby change focal length of said objective; a lever rockably mounted in said housing and supportingly connected with said second component; resilient means for biasing said lever to a position corresponding to the second position of said second component; and an illuminating arrangement comprising a member movable with reference to said housing from an inoperative position to an operative position and arranged to thereby rock said lever against the bias of said resilient means so as to move the second component into said first position.

6. In a camera, a housing; an objective mounted in said housing and comprising a plurality of lens components including a first component of fixed focal length and a second component movable between first and second positions into and out of registry with said first component to thereby change the focal length of said objective; a lever rockably mounted in said housing and supportingly connected with said second component; resilient means for biasing said lever to a position corresponding to the second position of said second component; stop means for arresting said lever against the bias of said resilient means in the second position of said second component; and a flash unit comprising a member movable with reference to said housing from an inoperative position to an operative position and arranged to thereby rock said lever against the bias of said resilient means so as to move the second component into said first position.

7. In a camera, a housing; an objective mounted in said housing and comprising a plurality of lens components including a first component of fixed focal length and a second component; a flash unit built into said housing and including a reflector reciprocable between operative and inoperative positions; and a carrier reciprocable with said reflector and connected with said second component to move said second component into registry with said first component and to thereby change the focal length of said objective in response to movement of said reflector from inoperative to operative position.

8. In a camera, a housing; an objective mounted in said housing and comprising a plurality of lens components including a first component of fixed focal length and a second component; a flash unit built into said housing and including a reflector reciprocable between operative and inoperative positions; and a carrier reciprocable with said reflector and connected with said second component to move said second component into registry with said first component and to thereby change the focal length of said objective in response to movement of said reflector from inoperative to operative position, said carrier having an aperture which registers with said first component in the inoperative position of said reflector.

9. In a camera, a housing; an objective mounted in said housing and comprising a plurality of optical lens components each having a predetermined focal length and including a first stationary lens component of fixed focal length and a second component movable between first and second positions into and out of registry with said first component to thereby reduce the focal length of said objective to less than said fixed focal length when in registry with said first component; a flash unit including a member movable with reference to said housing between operative and inoperative positions; and motion-transmitting means for moving said second component into registry with said first component in response to movement of said member to operative position.

10. In a camera, a housing; an objective mounted in said housing and comprising a plurality of optical lens components each having a predetermined focal length and including a first stationary lens component of fixed focal length suited for daylight photography and a second component movable into and out of registry with said first component to thereby change the focal length of said objective in such a way that the focal length is reduced to below said fixed focal length and is suited for operation in artificial light when the two components register with each other; an illuminating arrangement including a member movable with reference to said housing between operative and inoperative positions; and motion-transmitting means for moving said second component into registry with said first component in response to movement of said member to operative position.

11. In a camera comprising: an objective lens system adapted to focus at a predetermined plane within said camera an image of a viewed subject located beyond a predetermined distance from said camera; means of operatively associating an artificial illumination device with said camera; and focal distance reducing means operable to alter the optical relation of said objective lens system to said plane to focus at said plane an image of a viewed subject closer to said camera than said predetermined distance; the improvement comprising; movable means including a reflector member mounted on said camera and adapted to move from, a retracted position when said illumination device is operatively disassociated from said camera, to an extended position when said illumination device is operatively associated with said camera; and motion translating means operatively connecting said movable means and said focal distance reducing means for operating the latter in response to movement of said movement of said movable means from said retracted position to said extended position.

12. In a camera comprising: an objective lens system adapted to focus at a predetermined plane within said camera an image of a viewed subject located beyond a predetermined distance from said camera; means for operatively associating an artificial illumination device with said camera; and focal distance reducing means operable to alter the optical relation of said objective lens system to said plane to focus at said plane an image of a viewed subject closer to said camera than said predetermined distance; the improvement comprising; movable means adapted to move from, a first position when said illumination device is operatively disassociated from said camera, to a second position when said illumination device is operatively associated with said camera;
said focal distance reducing means including a supplement optical element movable into and out of the optical path of said objective lens system; and motion-translating means operatively connecting said movable means and said focal distance reducing means for moving the supplemental optical element in response to movement of said movable means from said first position to said second position.

13. The combination defined by claim 12 wherein said supplemental optical element comprises a flat transparent plate supported in the optical path of said objective lens system rearwardly thereof when said movable means is in said first position and movable out of said optical path by said motion-translating means in response to movement of said movable means to said second position.

14. A camera comprising:
support means for supporting a photosensitive surface at a predetermined plane within said camera;

a fixed focus objective lens adapted to focus at said plane an image of a subject located at less than a predetermined distance from said camera; and means for operatively associating an illumination device with said camera; characterized by:

a supplemental optical element movable between a first position in alignment with said objective lens rearwardly thereof whereby the focal length of said lens is extended to focus at said plane an image of a subject located beyond said predetermined distance from said camera, and a second position out of alignment with said objective lens; and means for moving said supplemental optical element to said second position when said illuminating device is operatively associated with said camera and to said first position when said illuminating device is operatively disassociated from said camera.

15. The invention defined by claim 14 characterized in that said supplemental optical element comprises a flat optically transparent plate.